(12) United States Patent
Canning et al.

(10) Patent No.: US 7,681,181 B2
(45) Date of Patent: Mar. 16, 2010

(54) METHOD, SYSTEM, AND APPARATUS FOR PROVIDING CUSTOM PRODUCT SUPPORT FOR A SOFTWARE PROGRAM BASED UPON STATES OF PROGRAM EXECUTION INSTABILITY

(75) Inventors: Benjamin Elliott Canning, Seattle, WA (US); Christopher Cameron White, Seattle, WA (US); Aaron Everett Erlandson, Redmond, WA (US); Thomas Scott Coon, Kirkland, WA (US); Eric LeVine, Seattle, WA (US); Steven Miles Greenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 10/955,421

(22) Filed: Sep. 30, 2004

(65) Prior Publication Data

US 2006/0070037 A1 Mar. 30, 2006

(51) Int. Cl.
*G06F 9/44* (2006.01)
*G06F 11/00* (2006.01)
(52) U.S. Cl. .................. 717/127; 717/124; 714/38
(58) Field of Classification Search ......... 717/124–135; 714/37, 38
See application file for complete search history.

(56) References Cited

U.S. PATENT DOCUMENTS

| | | | |
|---|---|---|---|
| 5,539,907 A * | 7/1996 | Srivastava et al. ........... 717/130 |
| 5,548,718 A * | 8/1996 | Siegel et al. .................. 714/38 |
| 5,655,074 A | 8/1997 | Rauscher ............... 395/183.14 |
| 5,678,002 A * | 10/1997 | Fawcett et al. .............. 715/709 |
| 6,195,695 B1 | 2/2001 | Cheston et al. ............. 709/221 |
| 6,219,805 B1 * | 4/2001 | Jones et al. ................... 714/38 |
| 6,363,524 B1 | 3/2002 | Loy ............................ 717/170 |
| 6,557,120 B1 | 4/2003 | Nicholson et al. ............. 714/38 |
| 6,594,774 B1 | 7/2003 | Chapman et al. ............... 714/2 |
| 6,629,144 B1 | 9/2003 | Chu et al. .................... 709/227 |
| 6,651,244 B1 * | 11/2003 | Smith et al. ................. 717/154 |
| 6,665,824 B1 | 12/2003 | Ruhlen et al. ................. 714/57 |
| 6,681,348 B1 | 1/2004 | Vachon ........................ 714/45 |
| 6,701,454 B1 | 3/2004 | Fischer et al. ................. 714/15 |

(Continued)

FOREIGN PATENT DOCUMENTS

EP 1 207 455 A2 5/2002

(Continued)

OTHER PUBLICATIONS

Ball et al., "Optimally Profiling and Tracing Programs," Jul. 1994, ACM, p. 1319-1360.*

(Continued)

*Primary Examiner*—Wei Y Zhen
*Assistant Examiner*—Qing Chen
(74) *Attorney, Agent, or Firm*—Merchant & Gould (57) ABSTRACT

A method and apparatus are provided for providing custom product support for a computer program based on levels of execution instability. The execution of a software program is monitored over a period of time to determine the execution stability of the program. Based upon the monitoring and upon one or more threshold levels of instability, the execution stability of the program is categorized. Based upon the categorization, custom program support may be provided for a user of the computer system executing the program. For instance, based on the categorization free or reduced fee product support may be provided.

17 Claims, 6 Drawing Sheets

U.S. PATENT DOCUMENTS

| | | |
|---|---|---|
| 6,708,333 B1 | 3/2004 | Glerum et al. ............... 717/171 |
| 6,728,907 B1 | 4/2004 | Wang et al. .................... 714/47 |
| 6,738,928 B1 | 5/2004 | Brown .......................... 714/26 |
| 6,748,554 B2 | 6/2004 | Jin et al. ....................... 714/15 |
| 6,785,015 B1* | 8/2004 | Smith et al. ................. 358/1.15 |
| 6,785,834 B2* | 8/2004 | Chefalas et al. ................. 714/4 |
| 6,785,848 B1 | 8/2004 | Glerum et al. ................. 714/38 |
| 6,915,342 B1* | 7/2005 | Motoyama .................. 709/224 |
| 7,050,936 B2* | 5/2006 | Levy et al. .................. 702/181 |
| 7,072,805 B2* | 7/2006 | Cascaval et al. ............ 702/196 |
| 7,171,651 B1* | 1/2007 | Greenberg et al. ........... 717/120 |
| 7,216,160 B2* | 5/2007 | Chintalapati et al. ........ 709/224 |
| 7,379,999 B1* | 5/2008 | Zhou et al. .................. 709/224 |
| 7,389,444 B2* | 6/2008 | Ma et al. ....................... 714/26 |
| 2002/0144124 A1* | 10/2002 | Remer et al. ................. 713/182 |
| 2003/0074657 A1* | 4/2003 | Bramley, Jr. ................. 717/168 |
| 2003/0084018 A1 | 5/2003 | Chintalapati et al. ........... 707/1 |
| 2003/0084376 A1* | 5/2003 | Nash et al. ..................... 714/38 |
| 2003/0187672 A1* | 10/2003 | Gibson et al. .................. 705/1 |
| 2003/0208593 A1 | 11/2003 | Bharati et al. |
| 2003/0225820 A1 | 12/2003 | Chkodrov et al. |
| 2004/0107387 A1 | 6/2004 | Larsson et al. |
| 2004/0236820 A1* | 11/2004 | Flocken ....................... 709/200 |
| 2005/0065803 A1* | 3/2005 | Creamer et al. ................. 705/1 |

FOREIGN PATENT DOCUMENTS

| | | |
|---|---|---|
| WO | WO 00/074193 A1 | 12/2000 |

OTHER PUBLICATIONS

Jeffery et al., "A Lightweight Architecture for Program Execution Monitoring," Jul. 1998, ACM, p. 67-74.*

Cimpan et al., "OMEGA: a language and system for on-line monitoring of software-intensive processes," Jul. 2000, ACM, p. 62-68.*

* cited by examiner

METHOD, SYSTEM, AND APPARATUS FOR PROVIDING CUSTOM PRODUCT SUPPORT FOR A SOFTWARE PROGRAM BASED UPON STATES OF PROGRAM EXECUTION INSTABILITY

BACKGROUND OF THE INVENTION

One of the most important stages in the software development cycle is the debugging stage that occurs after a software product has been shipped to customers. This stage is important because the actual experiences of users of the software product may be utilized during this stage to isolate program errors, identify frequently or infrequently used features, and to generally make the software product better and more stable.

The main focus of analysis in the after-release debugging stage is typically to identify the program errors (also referred to herein as "bugs") that occur most frequently. By identifying the most frequently occurring bugs and fixing them, the usability experience of many users can be improved. There is another category of analysis, however, that has been generally unaddressed by previous after-release debugging systems. This category involves identifying computer systems that most frequently encounter problems during the execution of an application program. These problems may or may not include the program errors that occur most frequently amongst all users.

Statistics show that a small number of users experience a high percentage of the total number of overall problems. Such problems may include program crashes, program hangs, abrupt program terminations, and other types of abnormal program terminations. Application programs that exhibit these types of problems are generally referred to herein as being "unstable" or having "program execution instability." An unstable program can be particularly frustrating for the computer user that frequently encounters the problems while using the program.

Previous after-release debugging systems do not provide a way to identify computer systems having the highest frequency of program execution instability and therefore do not provide a mechanism for the software developer to assist the user experiencing the problems. Accordingly, there is a need for a method, system, and apparatus for identifying computer systems having a high frequency of program execution instability and for providing custom product support to a user of such a computer system.

It is with respect to these considerations and others that the various embodiments of the present invention have been made.

BRIEF SUMMARY OF THE INVENTION

In accordance with embodiments of the present invention, the above and other problems are solved by a method and apparatus for providing custom product support for a computer program based on states of execution instability. By identifying computer systems having varying levels of program execution instability, custom product support can be provided to users having the highest frequency of program execution errors. Because the provision of custom product support is based on categorizing into states of program instability based on thresholds, the thresholds may be adjusted to provide custom product support to varying numbers of users.

According to one aspect of the invention, a method is provided for providing custom product support for a software program based on states of program execution instability. According to the method, the execution of a software program is monitored over a period of time to determine the execution stability of the program. Based upon the monitoring and upon one or more threshold levels of instability, the execution stability of the program is categorized into a state. For instance, the stability of the program may be categorized as "fine," "bad," or "very bad." Based upon the categorization, custom program support may be provided for a user of the computer system executing the program. For instance, based on the categorization free or reduced fee product support may be provided. Alternatively, a user of the computer may be directed to an information resource, such as a web page, that is determined based upon the state. Likewise, a diagnostic program may be executed to identify and repair problems with the computer system and the application program based upon the categorization.

According to aspects of the method, monitoring the execution of the software program over a period of time may be performed by generating a session entry in a log each time the program is executed. The session entry includes data identifying the program, the length of time the program was executed, and data indicating whether the program was terminated normally or abnormally. An abnormal termination may include a program crash, a program hang (where the program continues executing, but appears unresponsive to the user), or any other type of abnormal termination (such as if power was removed from the computer while the program was executing).

The execution stability of the program may be determined based upon an analysis of the log. In particular, one or more statistics may be generated that describe the execution stability of the program. For instance, the number of abnormal terminations per number of program executions may be computed. Similarly, the number of abnormal terminations per number of minutes of program execution may be calculated. Other types of statistics may also be generated.

In order to categorize the execution stability of the program into a state, one or more threshold levels of instability may be utilized. The threshold values may be stored at the computer system and may be periodically updated from a server computer in a remote control file. The threshold values define the values that should be utilized to categorize the stability of the program execution. The threshold values are compared to the statistics to categorize the stability of the program into the one or more states of program execution instability. The thresholds may be provided in the remote control file for different versions of the program. The contents of the remote control file may be periodically modified to change the threshold values.

The invention may be implemented as a computer process, a computing apparatus or system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the embodiments of the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. Referring now to the drawings, in which like numerals represent like elements through the several figures, aspects of the present invention and the exemplary operating environment will be described.

Figure 1:
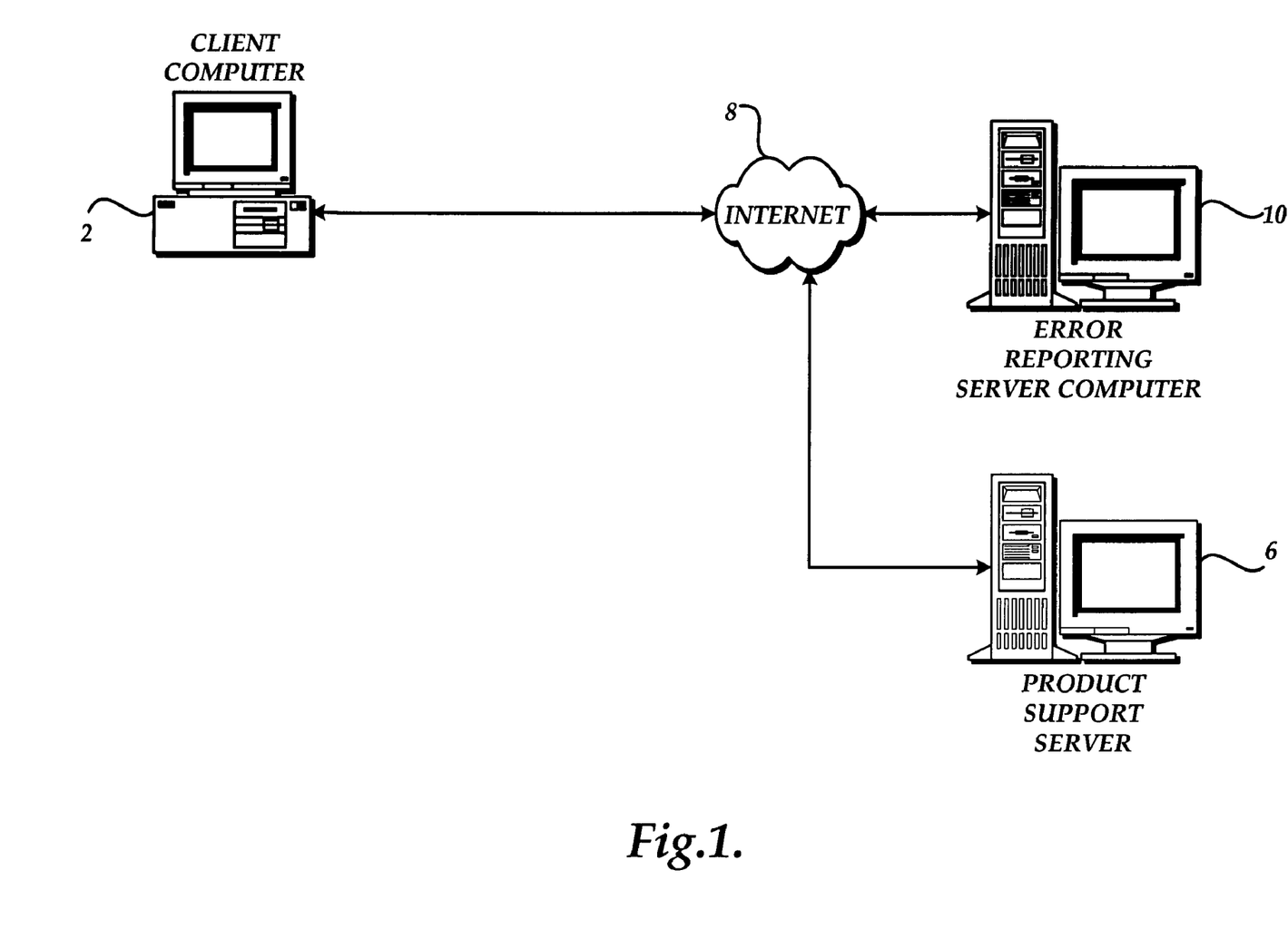
FIG. 1 is a network diagram illustrating aspects of a computer network utilized to embody various aspects of the invention.

FIG. 1 shows an illustrative operating environment for various embodiments of the present invention. As shown in FIG. 1, a client computer 2 is utilized in the various embodiments of the invention. The client computer comprises a standard desktop or server computer that may be used to execute one or more program modules. The client computer 2 is also equipped with program modules for monitoring the execution of application programs and for determining the execution stability of the programs. The client computer 2 is also operative to classify the stability of the programs based on one or more threshold values and to provide custom product support for the applications based on the classification.

In order to classify the stability of the programs executing at the client computer 2, the client computer 2 is also operative to periodically receive a remote control file from an error reporting server computer 10 operated by a developer of the software program. The error reporting server computer 10 comprises a conventional server computer maintained and accessible through a LAN or the internet 8. The error reporting server computer 10 is operated by a developer of an application program of interest. Additional details regarding the contents and use of the remote control file will be provided below with respect to FIGS. 2-7. A product support server computer 6 may also be operated by the developer to provide custom product support. For instance, the product support server may provide web pages or other information based upon the level of program instability a user experiences.

Figure 2:
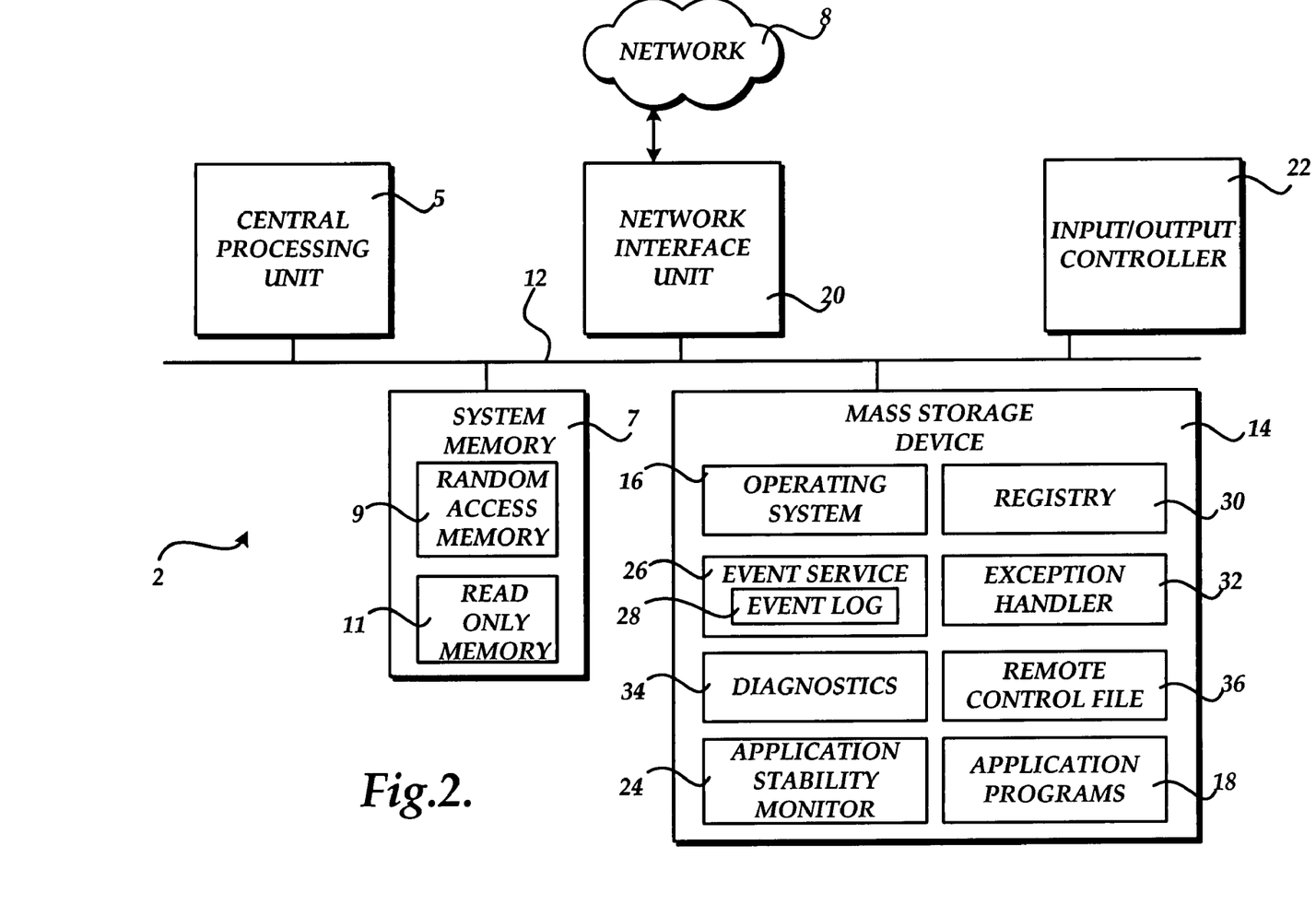
FIG. 2 is a computer system architecture diagram illustrating a computer system utilized in and provided by the various embodiments of the invention.

Referring now to FIG. 2, an illustrative computer architecture for a client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs 18, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 8, such as the internet. The client computer 2 may connect to the network 8 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an application stability monitor program 24 for monitoring the execution stability of one or more of the application programs 18 and for providing custom product support for the application programs 18 if the program becomes unstable beyond certain settable thresholds. The application stability monitor 24 may be executed in response to the execution of an exception handler 32 that is operative to catch and handle program execution exceptions within the client computer 2. The application stability monitor 24 may also be executed manually by a user of the client computer 2.

In order to monitor the stability of the application programs 18, the application stability monitor 24 utilizes the services of an event service 26. The event service 26 is a facility provided by the operating system 26 for logging events occurring at the client computer 2 to an event log 28. For instance, the event service 26 may log security-related events (e.g. an unauthorized login attempt), system-related events (e.g. a disk drive experiencing failures), and application-related events. As will be described in greater detail below, events regarding the execution and failure of the application programs 18 are recorded in the event log 28. In particular, a session entry may be generated in the event log 28 each time an application program is executed. The session entry includes data identifying the program, the length of time the program was executed, and data indicating whether the program was terminated normally or abnormally. An abnormal termination may include a program crash, a program hang (where the program continues executing, but appears unresponsive to the user), or any other type of abnormal termination (such as if power was removed from the computer while the program was executing).

As will be described in greater detail below, the event log 28 may be periodically parsed and statistics generated that describe the stability of the application programs 18. The statistics may include data defining the number of abnormal terminations per number of program executions, the number of abnormal terminations per number of minutes of program execution may be calculated, or other types of statistics indicating the stability of the application programs 18.

Once the statistics have been generated, the execution stability of the programs may be categorized into states based upon the statistics and one or more threshold values stored in a remote control file 36. The threshold values define various levels of program instability. For example, threshold values may be defined that categorize the execution of a program module as "fine," "bad," or "very bad." According to one embodiment of the invention, the "fine" threshold indicates that the application program is sufficiently stable that no action should be taken. The "bad" threshold indicates that the application program is somewhat unstable, but not unstable enough to warrant the provision of free or reduced fee product support to the user. The user may be directed to diagnostics or other information. The "very bad" threshold indicates that the application stability is so poor that free or reduced fee product support is warranted. It should be appreciated that more than three thresholds may be defined and the definitions of these thresholds may vary according to the software product and its developer. It should be appreciated that monitoring of the performance of the application program and the provision of custom support may be enabled by the developer of the application program on an application-by-application basis.

The contents of the remote control file 36 may be periodically updated and transmitted to the client computer 2 from the error reporting server computer 10. The remote control file 36 may also store expiration dates for each threshold defining a time after which the thresholds should not be utilized. The remote control file 36 may also store application version numbers for each of the thresholds. The application version numbers allow different thresholds to be assigned to different versions of an application program that may be installed and in use at the client computer 2. It should be appreciated that the remote control file 36 may store other data and may be utilized to control the operation of the client computer 2 in additional ways. More information regarding the content and use of the remote control file can be found in co-pending U.S. patent application Ser. No. 10/304,282, which is entitled "Method and System for Remotely Controlling the Reporting of Events Occurring within a Computer System" and which is expressly incorporated herein by reference.

Based upon the assigned threshold, custom program support may be provided for a user of the computer system executing the program by the application stability monitor 24. For instance, based on the categorization, the user may be directed to free or reduced fee product support. Alternatively, a user of the computer may be directed to an information resource, such as a web page, that is determined based upon the categorization. Likewise, a diagnostic program 34 may be executed to identify and repair problems with the computer system and the application program based upon the categorization.

According to embodiments of the invention, the operating system 16 is operative to store data in a registry 30. The registry 30 is a central hierarchical database utilized to store information necessary to configure the client computer 2 for one or more users, applications, and hardware devices. For instance, the registry 30 is operative to store a "last fix time" registry key that identifies the last time which a repair was made to the software components on the client computer by the diagnostics 34. The registry 30 is further operative to store a "diagnostic state" registry key that identifies the current user's prior interactions with the application stability monitor 24. The possible values for the diagnostic state registry key are "new" where the user has not previously utilized the application stability monitor 24, "altered" where the diagnostics 34 were previously executed and changes were made to the client computer 2, "identified" where the diagnostics 34 were executed and it was determined that the problem causing the instability is external to the application programs 18 (e.g. such as a hardware failure), and "help" where diagnostics were executed and the user was directed to customer support in the form of a product support specialist ("PSS"). As will be described in greater detail below, the value of the "diagnostic state" registry key is utilized to determine how a newly encountered problem should be handled for a user. Additional details regarding creation of the event log 28, operation of the exception handler 32, and the operation of the application stability monitor 24 will be provided in greater detail below with respect to FIGS. 3-7.

Figure 3:
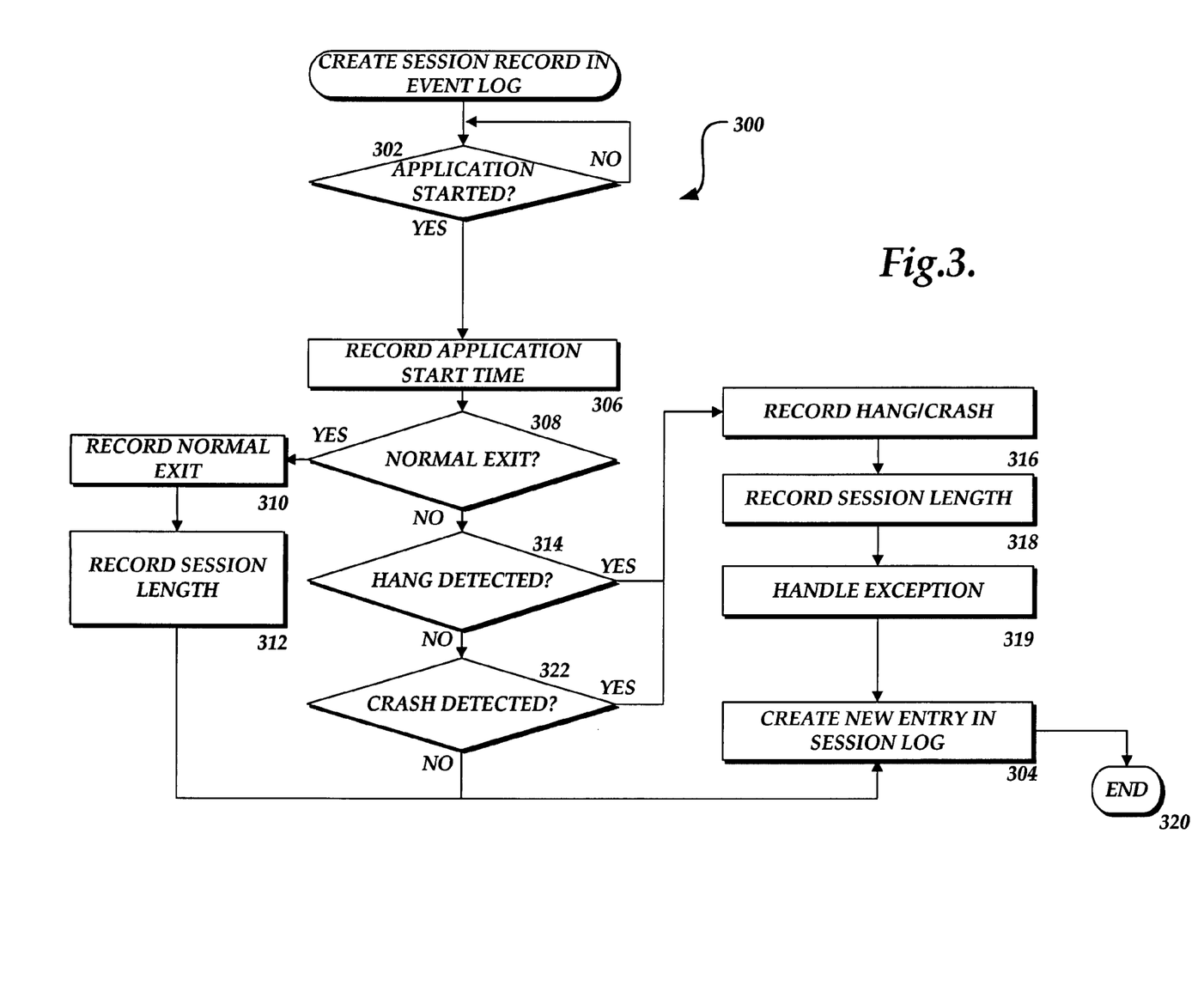
FIGS. 3-7 are flow diagrams illustrating processes provided by and utilized in the various embodiments of the present invention.

Referring now to FIG. 3, an illustrative routine 300 will be described illustrating a process performed for creating records in the event log 28. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3-7, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where a determination is made by the event service 26 as to whether one of the application program 18 has been started. If an application program has not been started, the routine 300 returns to decision operation 302, where another determination is made. If an application program has been started, the routine 300 continues to operation 306, where the time the application was started is stored in memory From operation 306, the routine 300 continues to operation 308, where the event service 26 determines whether the application program was exited normally, such as in response to a user request. If the application program exited normally, the routine 300 branches to operation 310, where data is stored in memory indicating that the application exited normally. The routine 300 then continues to operation 312, where the length of time the application executed during the session is recorded to in memory. The routine 300 then continues from operation 312 to operation 304 where a new entry is created in the event log 28 for the current application session ("a session entry"). The data recording in memory regarding the execution of the program is then stored in the session entry. These operations may be performed within an exception handler. From operation 304, the routine 300 continues to operation 320, where it ends.

If, at operation 308, the event service 26 determines that the application program did not terminate its execution normally, the routine 300 continues from operation 308 to operation 314. At decision operation 314, a determination is made as to whether the application program has hung. A hung application is an application that appears to be executing but is not responsive to user input. It should be appreciated that the determination as to whether a program has hung may be may be the operating system or by another program. If the application appears to have hung, the routine 300 branches from operation 314 to operation 316. If the application has not hung, the routine 300 continues from operation 314 to decision operation 322. At decision operation 322, a determination is made as to whether the application program crashed. A program crash refers to the failure of a program to perform correctly, resulting in suspension of operation of the program. If a crash is detected at operation 322, the routine 300 branches to operation 316. If a crash is not detected, the operation 300 continues to operation 320, where it ends. It should be appreciated that in the case of a program crash, the operating system can force a crashed application program to shut down automatically. In the case of a hung program, it is up to the user to notice that the program is hung and to restart the program.

At operation 316, data is written to memory indicating that the session ended in either a crash or a hang, as appropriate. The routine 300 then continues to operation 318, where the length that the application executed before the crash or hang is recorded in memory. The routine 300 then continues from operation 318 to operation 319, where the exception is handled by the operating system. Details regarding aspects of the operation of the exception handler 32 are provided below with respect to FIG. 5. The routine 300 then continues to operation to operation 304 where a new entry is created in the event log 28 for the current application session. The data recording in memory regarding the execution of the program is then stored in the session entry. From operation 319, the routine 300 continues to operation 320, where it ends.

Figure 4:
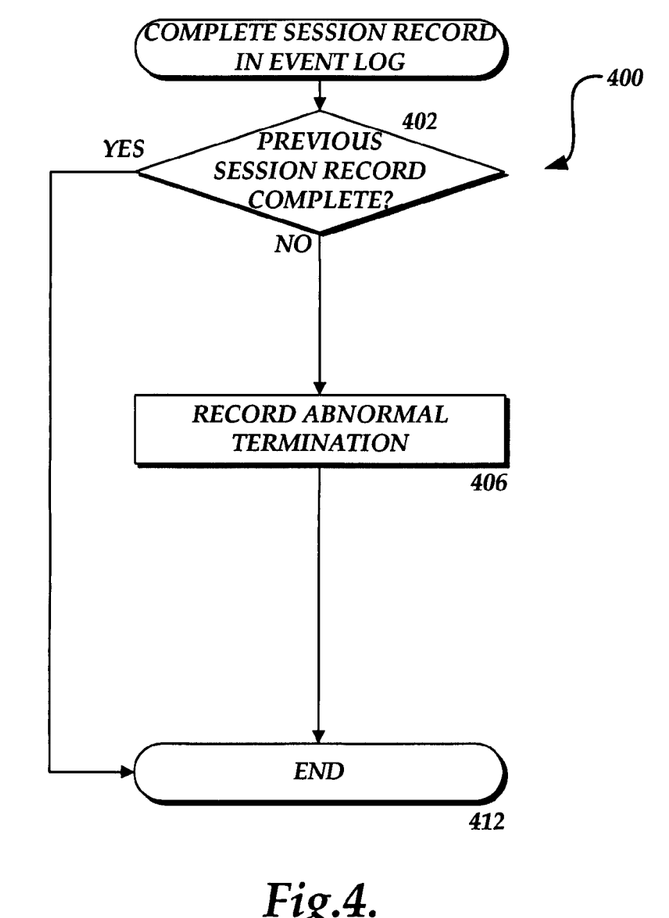

Referring now to FIG. 4, details will be provided for a routine 400 for completing a session entry in the event log. According to embodiments of the invention, the routine 400 is executed on the client computer 2 at startup to complete session entries in the event log 28 that may not have been completed. Uncompleted session entries can occur, for instance, if power is removed from the computer 2 while the application is executing, if a crash results in a crash to the operation system 16, or under any other circumstances where the type of termination and session length cannot be written to the event log 28.

The routine 400 begins at operation 402, where a determination is made as to whether the previous session entry is complete. If the session entry is complete, there is no need to perform any further processing on the session entry. Accordingly, the routine 400 branches from operation 402 to operation 412, where it ends, if the session entry is complete. If the session entry is not complete, the routine 400 continues to operation 406, where an indication is made in the session entry that the application program terminated abnormally. The routine 400 then continues to operation 412, where it ends.

Figure 5:
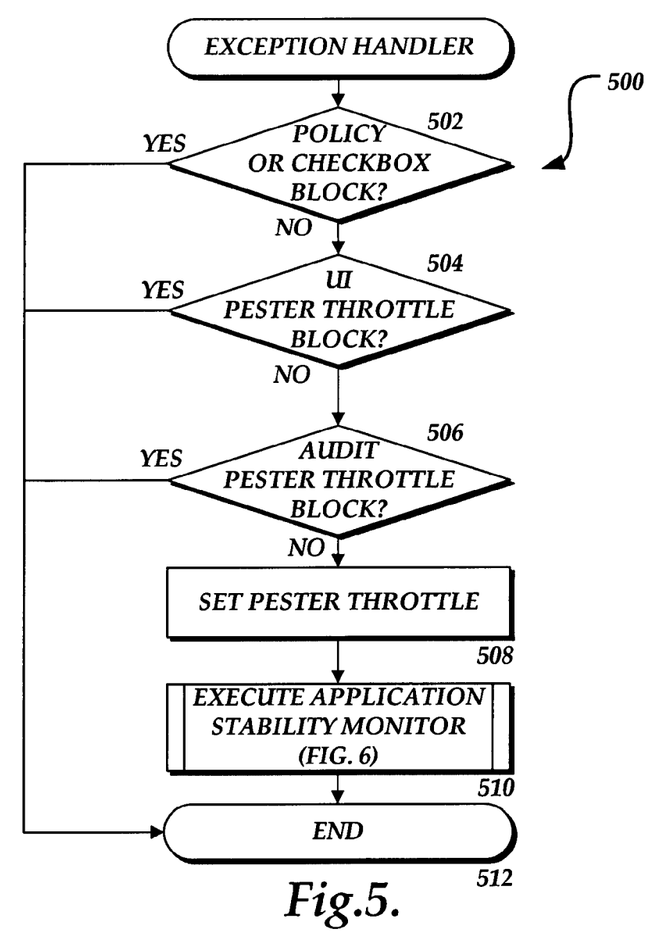

Referring now to FIG. 5, additional details regarding the operation of the exception handler 32 will be described. As discussed briefly above, the exception handler 32 is called following the abnormal termination of an application program. It should be appreciated that the exception handler 32 performs many more functions for catching and handling exceptions than those shown in FIG. 5. Only those functions performed by the exception handler relevant to a discussion of the operation of the application stability monitor 24 are shown in FIG. 5 and described herein.

The routine 500 begins at operation 502, where a determination is made as to whether a policy implemented at the client computer 2 or a registry entry indicating that the user does not want to be bothered with reporting prevents the execution of the application stability monitor 24. If so, the routine 500 branches to operation 512, where it ends. If not, the routine 500 continues to operation 504, where a determination is made as to whether a user interface ("UI") pester throttle prevents the application stability monitor 24 from executing. The UI pester throttle prevents the user from being bothered too frequently with UI relating to application performance monitoring. If the UI pester throttle blocks the execution of the application stability monitor 24, the routine 500 branches to operation 512, where it ends. Otherwise, the routine 500 continues to operation 506, where a determination is made as to whether an audit pester throttle blocks the execution of the application stability monitor 24. The audit pester throttle keeps the application stability monitor 24 from executing too frequently and impacting the performance of the client computer 2. If the audit pester throttle does blocks the execution of the application stability monitor 24, the routine 50 branches to operation 512, where it ends. Otherwise the routine 500 continues from operation 506 to operation 508. Additional details regarding the operation of the UI pester throttle and the audit pester throttle can be found in co-pending U.S. patent application Ser. No. 10/305,215, and entitled "Queued Mode Transmission of Event Reports" which is expressly incorporated herein by reference.

Figure 6:
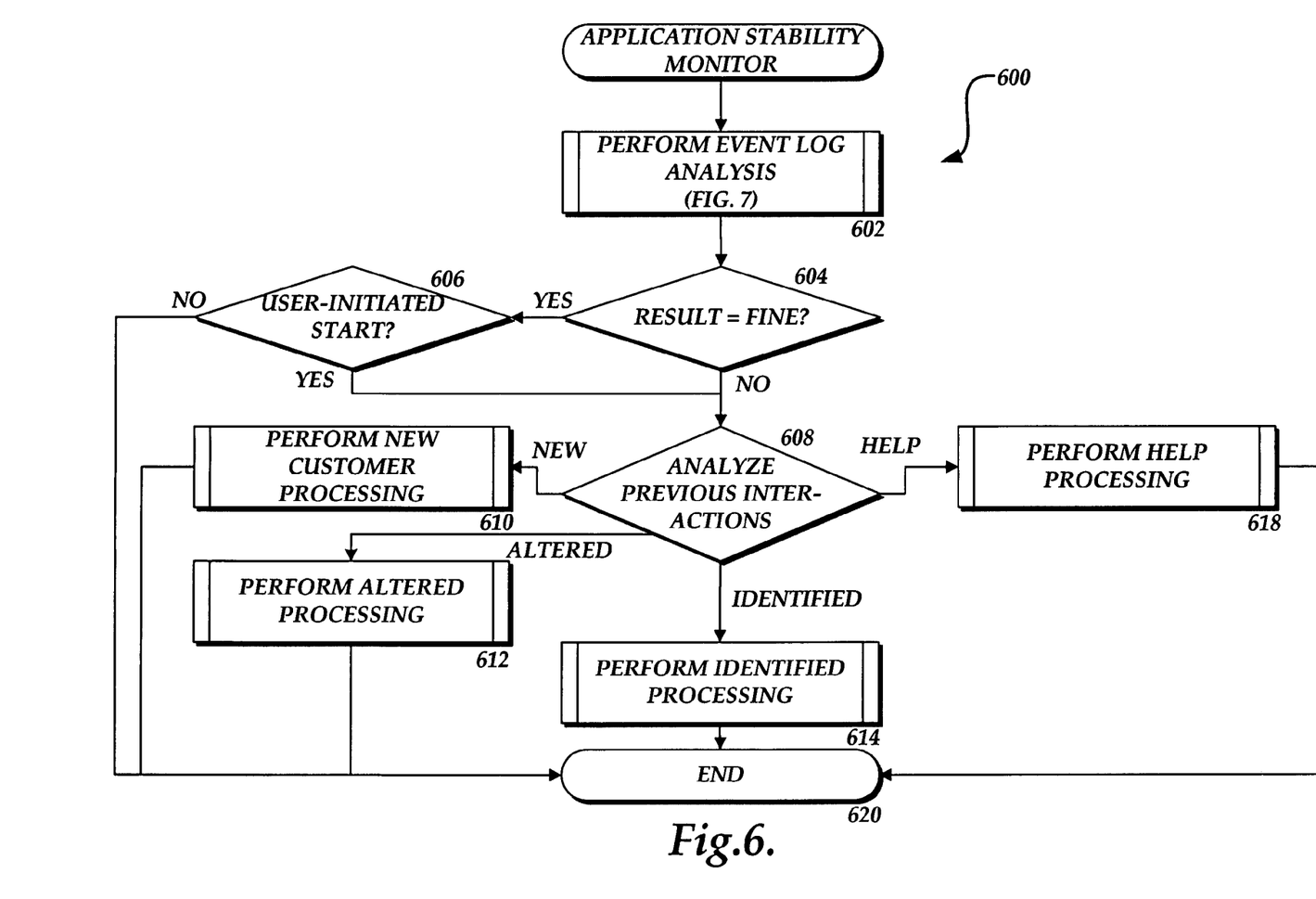

Referring now to FIG. 6, additional details regarding the operation of the application stability monitor 24 will be provided. In particular, the routine 600 will be described for executing the application stability monitor 24. The routine 600 begins at operation 602, where an analysis of the event log 28 is performed. The event log 28 is analyzed to categorize the stability of the application program into a state of stability. As discussed above, according to one embodiment of the invention, the stability may be categorized as "fine," "bad," or "very bad." An illustrative routine 700 for performing the event log analysis is described below with respect to FIG. 7.

From operation 602, the routine 600 continues to operation 604, where a determination is made as to whether the stability of the application program was categorized as "fine" by the event log analysis. If the stability of the application program is "fine" the routine 600 branches to operation 606 where a determination is made as to whether the application stability monitor 24 was started manually by a user. If the application stability monitor 24 was not started manually, the routine 600 branches to operation 620, where it ends. If the application stability monitor 24 was started manually, the routine 600 continues from operation 606 to operation 608. This allows a user to interact with the application stability monitor 24 if they start the program manually even where the stability of the program is "fine."

If, at operation 604, it is determined that the stability of the application program was categorized as "bad" or "very bad" by the event log analysis, the routine 600 continues from operation 604 to operation 608. At operation 608, the routine 600 branches to either operation 610, 612, 614, 616, or 616 based on the users previous interactions with the application stability monitor, as defined by the current value of the diagnostic state registry key described above. If the value of the diagnostic state registry key is "new", the routine 600 branches to operation 610. This means that the user has not previously utilized the application stability monitor 24. Accordingly, a dialog box may be present to the user for executing the diagnostics 34. Depending upon the result of the diagnostics, the value of the diagnostic state registry key may be set to "help," "altered," or "identified."

If the value of the diagnostics state registry key is "diagnostics altered," the routine 600 branches from operation 608 to operation 612. This indicates that the diagnostics were executed previously and that changes were made to the configuration of the application program in an attempt to improve its stability. At this point, the user may be directed to free or reduced fee product support for the product. Depending on the chosen course, the value of the diagnostic state registry key may be set to "help," "altered," or "identified."

If the value of the diagnostics state registry key is "diagnostics external," the routine 600 branches to operation 614. This indicates that the diagnostics 34 were performed previously and a problem was detected other than the application program. In this case, the user is not bothered with any user interface notices.

If the value of the diagnostics state registry key is "help," the routine 600 branches to operation 618. This indicates that the user has previously been provided with information for reduced fee or free product support. The user may again be given this information. For instance, the user may be directed to a product support web site where product support may be obtained. From operations 610, 612, 614, and 618, the routine 600 continues to operation 620, where it ends.

Figure 7:
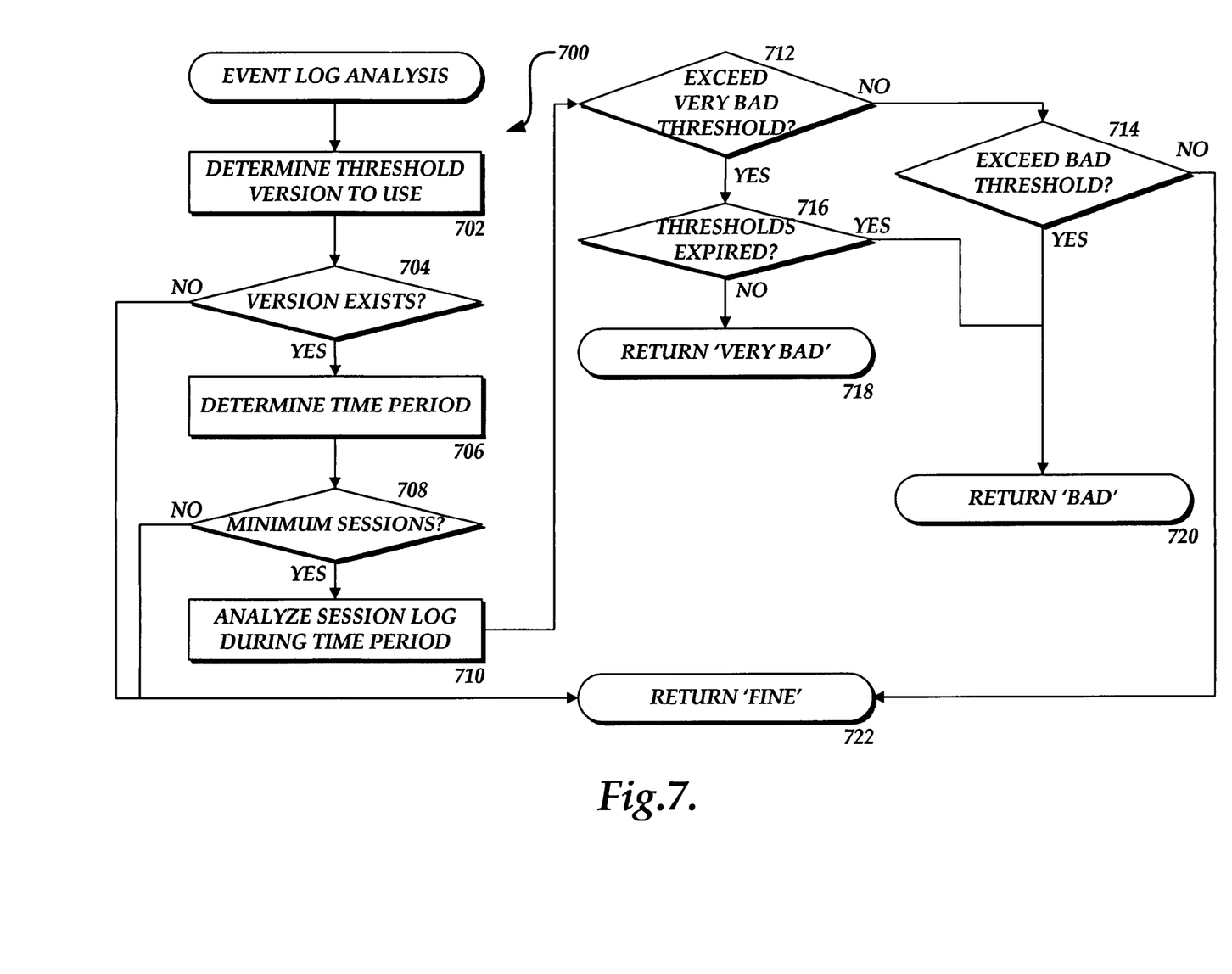

Turning now to FIG. 7, the routine 700 will be described for analyzing the event log 28. The routine 700 begins at operation 700 where a determination is made as to which threshold version to utilize. As discussed above, the threshold values may be assigned a version number corresponding to versions of an application program on the client computer 2. This allows different thresholds to be assigned to different versions of the same application program. The threshold version to use is determined based on the version of the application program for which an analysis is to be performed.

Once the version number of the application program has been identified, the routine 700 continues to operation 704, where a determination is made as to whether threshold values are present in the remote control file 36 for the version of the application program. If no threshold values exist for the version, the routine 700 branches to operation 722, where a threshold value of "fine" is returned. If, however, the proper threshold values do exist, then the routine 700 continues to operation 706.

At operation 706, the proper time period of entries in the event log that should be utilized in the session analysis is determined. The time period may comprise the period of time between the current time and the last time a repair was applied to the application program. Alternatively, if no repairs have been made, the time period may comprise the time period between the current time and a preferred time window (30 days for instance). In this manner, the universe of log entries that are considered in the analysis may be limited.

From operation 706, the routine 700 continues to operation 708, where a determination is made as to whether a statistically significant minimum number of sessions are present in the event log 28 for the computed time period. If the requisite minimum number of sessions are not present, the routine 700 branches to operation 722, where a threshold value of "fine" is returned. If the requisite minimum number of sessions exists, the routine 700 continues from operation 708 to operation 710.

At operation 710, a number of statistics are generated based upon the contents of the event log 28 for the time period and for the particular application program that describe the stability of the application programs. For instance, a statistic may be generated based on the number of abnormal terminations of the program per number of program executions. Another statistic that may be generated is based on the number of abnormal terminations per number of minutes of program execution. Other types of statistics indicating the stability of the application program may also be generated based on the contents of the event log 28 during the time period. It should be appreciated that certain statistics may be generated for individual applications and that other statistics may be generated for groups of applications, such as application suites.

Once the statistics have been generated, the statistics are compared to the threshold values contained in the remote control file 36. Based on the comparison, the stability of the application program may be categorized as "fine," "bad," or "very bad." Once the stability of the application program has been categorized, the routine 700 continues to operation 712, where a determination is made as to whether the stability of the program has been categorized as very bad. If the stability has not been categorized as very bad, the routine 700 branches to operation 714 where a determination is made as to whether the stability has been categorized as bad. If the stability has been categorized as bad, the routine 700 continues to operation 700 where the "bad" threshold is returned. If the stability has not been categorized as "bad," the routine branches to operation 722, where "fine" is returned.

If, at operation 712, it is determined that the threshold has been categorized as "very bad", the routine 700 continues to operation 716. At operation 716, a determination is made as to whether the threshold values have expired. As discussed briefly above, the thresholds may include expiration dates. If the threshold values have expired, the routine 700 branches to operation 720 where "bad" is returned. Otherwise the routine 700 continues to operation 718, where "very bad" is returned.

Based on the foregoing, it should be appreciated that the various embodiments of the invention include a method, system, apparatus, and computer-readable medium for providing custom product support for a computer program based on levels of execution instability. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing custom product support for a software program based on states of program execution instability, the method comprising:
   receiving a remote control file, the remote control file comprising at least one threshold level of program execution instability and at least one expiration date associated with the at least one threshold level of program execution instability;
   monitoring, by a computing system comprising a processor coupled to a memory storage, execution of the software program over a period of time to determine execution stability of the software program by:
      generating a session entry in a log each time the software program is executed, the session entry comprising data identifying the software program and a length of time the software program was executed,
      periodically analyzing the log to generate at least one statistic that describes the execution stability of the software program according to the session entry, and
      indicating whether the execution of the software program was terminated one of:
   normally and abnormally, wherein an abnormal termination comprises at least one of: a program crash, a program hang, and an abnormal program termination;
   determining whether the at least one expiration date associated with the at least one threshold level of program execution instability has not passed;
   in response to determining whether the at least one expiration date associated with the at least one threshold level of program execution instability has not passed, categorizing, by the computing system, the execution stability of the software program based on the at least one threshold level of program execution instability by comparing the at least one statistic to a corresponding threshold to categorize the execution stability of the software program into one of a plurality of states of program execution instability;
   identifying, by the computing system, a previously established diagnostic state of the software program; and
   providing the custom product support for the software program based upon the categorization and the previously established diagnostic state of the software program.

2. The method of claim 1, wherein analyzing the log to generate the at least one statistic that describes the execution stability of the software program comprises generating the at least one statistic comprising a number of abnormal terminations per number of program executions.

3. The method of claim 2, wherein analyzing the log to generate the at least one statistic that describes the execution stability of the software program further comprises generating the at least one statistic comprising the number of abnormal terminations per number of minutes of program execution.

4. The method of claim 1, wherein receiving the remote control file comprises receiving the remote control file containing data identifying the at least one threshold level of program execution instability for at least one version of the software program, and wherein the method further comprises determining whether the remote control file contains thresholds for the at least one version of the software program prior to categorizing the execution stability of the software program.

5. The method of claim 4, wherein providing the custom product support for the software program comprises directing a user of the software program to an information resource having one of: free and reduced fee product support for the software program based upon the categorization.

6. The method of claim 4, wherein providing the custom product support for the software program comprises directing a user of the software program to an information resource identified based upon the categorization.

7. The method of claim 4, wherein providing the custom product support for the software program comprises executing a diagnostic program based upon the categorization.

8. A system for providing custom product support for a software program based on threshold levels of program execution instability, the system comprising:
   a client computer operative to:
      receive a remote control file from a server computer containing data identifying at least one threshold level of program execution instability for at least one version of the software program and at least one expiration date associated with the at least one threshold level of program execution instability,
      monitor execution of a software program over a period of time to determine execution stability of the software program by:
         generating a session entry in a log stored at the client computer each time the software program is executed, the session entry comprising data identifying the software program and a length of time the software program was executed,
         periodically analyzing the log at the client computer to generate at least one statistic that describes the execution stability of the software program according to the session entry, and
         indicating whether the execution of the software program was terminated one of: normally and abnormally, wherein an abnormal termination comprises at least one of: a program crash, a program hang, and an abnormal program termination,
      determine whether the at least one expiration date associated with the at least one threshold level of program execution instability has not passed,
      in response to determining whether the at least one expiration date associated with the at least one threshold level of program execution instability has not passed, categorize the execution stability of the software program based on the at least one threshold level of program execution instability contained in the remote control file by comparing the at least one statistic to a corresponding threshold to categorize the execution stability of the software program into one of a plurality of states of program execution instability,
      identify a previously established diagnostic state of the software program, and
      provide the custom product support for the software program based upon the categorization and the previously established diagnostic state of the software program.

9. The system of claim 8, wherein the at least one statistic comprises a number of abnormal terminations per number of program executions.

10. The system of claim 9, wherein the at least one statistic further comprises a number of abnormal terminations per number of minutes of program execution.

11. The system of claim 10, wherein the client computer being operative to provide the custom product support for the software program comprises the client computer being operative to direct a user to an information resource providing one of: free and reduced fee product support depending on the at least one threshold level of program execution instability.

12. The system of claim 10, wherein the client computer being operative to provide the custom product support for the software program comprises the client computer being operative to direct a user of the client computer to an information resource, the information resource is determined based on the at least one threshold level of program execution instability.

13. The system of claim 10, wherein the client computer being operative to provide the custom product support for the software program comprises the client computer being operative to execute a diagnostic program on the client computer to diagnose problems with the software program.

14. A computer-readable storage medium having computer executable instructions stored thereon which, when executed by a computer, cause the computer to:
receive a remote control file, the remote control file comprising at least one threshold level of program execution instability and at least one expiration date associated with the at least one threshold level of program execution instability;
monitor execution of a software program over a period of time to determine execution stability of the software program by:
generating a session entry in a log each time the software program is executed, the session entry comprising data identifying the software program and a length of time the software program was executed,
periodically analyzing the log to generate at least one statistic that describes the execution stability of the software program according to the session entry, and indicating whether the execution of the software program was terminated one of:
normally and abnormally, wherein an abnormal termination comprises at least one of: a program crash, a program hang, and an abnormal program termination;
determine whether the at least one expiration date associated with the at least one threshold level of program execution instability has not passed;
in response to determining whether the at least one expiration date associated with the at least one threshold level of program execution instability has not passed, categorize the execution stability of the software program based on the at least one threshold level of program execution instability by comparing the at least one statistic to a corresponding threshold to categorize the execution stability of the software program into one of a plurality of states of program execution instability;
identify a previously established diagnostic state of the software program; and
provide custom product support for the software program based upon the categorization and the previously established diagnostic state of the software program.

15. The computer-readable storage medium of claim 14, wherein the at least one statistic comprises a number of abnormal terminations per number of program executions.

16. The computer-readable storage medium of claim 14, wherein the at least one statistic further comprises a number of abnormal terminations per number of minutes of program execution.

17. The computer-readable storage medium of claim 14, wherein the computer executable instructions further comprise instructions to execute a diagnostic program on the computer to diagnose problems with the software program.

* * * * *